(12) United States Patent
Chundi (10) Patent No.: US 11,148,177 B2
(45) Date of Patent: Oct. 19, 2021

(54) INSULATOR CLEANER

(71) Applicant: Venkata Rama Subba Rao Chundi, Cumming, GA (US)

(72) Inventor: Venkata Rama Subba Rao Chundi, Cumming, GA (US)

(*) Notice: Subject to any disclaimer, the term of this patent is extended or adjusted under 35 U.S.C. 154(b) by 262 days.

(21) Appl. No.: 16/549,734

(22) Filed: Aug. 23, 2019

(65) Prior Publication Data

US 2020/0061676 A1 Feb. 27, 2020

Related U.S. Application Data

(60) Provisional application No. 62/722,047, filed on Aug. 23, 2018.

(51) Int. Cl.
*B08B 1/04* (2006.01)
*B08B 1/00* (2006.01)
*A46B 13/02* (2006.01)

(52) U.S. Cl.
CPC ............... *B08B 1/04* (2013.01); *A46B 13/02* (2013.01); *B08B 1/001* (2013.01)

(58) Field of Classification Search
CPC .. B08B 1/04; B08B 1/001; H02G 1/02; A46B 13/02
See application file for complete search history.

(56) References Cited

U.S. PATENT DOCUMENTS

| | | | |
|---|---|---|---|
| 3,527,611 A * | 9/1970 | Newfarmer | B08B 9/023 134/6 |
| 5,119,851 A * | 6/1992 | Paris | H02G 1/02 134/172 |
| 7,200,889 B2 * | 4/2007 | Vohra | B08B 1/008 134/198 |

FOREIGN PATENT DOCUMENTS

DE 3508769 A1 * 9/1986 ............. H02G 1/02

* cited by examiner

*Primary Examiner* — Shay Karls (57) ABSTRACT

The present invention describes an insulator stack cleaner to remove dust and dirt from power line transmission insulators. The cleaner autonomously cleans an insulator stack. The cleaner has two cleaning cups that counter-rotate during cleaning. The cleaner moves along an insulator stack by opening one cleaning cup while the other cup is locked onto an insulator, then the cleaner's transitional motors somersault the open cup onto the next insulator in the stack, and the open cup subsequently closes around the next insulator. A rack and pinion mechanism rotates the closed cup around an insulator and a cam mechanism opens and closes the cup around an insulator. Bristles on the cleaning cups scrub the insulators. The cleaner can be installed onto an insulator stack by a drone.

12 Claims, 14 Drawing Sheets

INSULATOR CLEANER

This application claims the priority of U.S. Provisional Patent application No. 62/722,047, filed on Aug. 23, 2018. The present invention relates to an apparatus for cleaning insulators, namely insulators on power line towers carrying high voltage cables. This apparatus is autonomous, and can be installed onto an insulator string or column by a drone, helicopter, or from the ground via a crane. This apparatus removes bird waste, dust, pollutants, and other foreign objects that are deposited on insulators over time. It is safer if compared to existing practices such as a high-pressure water jet or helicopter-mounted cleaners.

BACKGROUND

Power line insulators need to be periodically washed to prevent loss of efficiency through insulator flashovers, electric arcing and corona discharge. Over time, a layer of contaminants accumulates on insulators due to static electricity, weather and wildlife. If not washed, contamination on insulators will cause leakage current eventually leading to power outages.

Washing insulators is dangerous work that has to be done by trained professionals, and subjects people to high-risk environments. For example, there is known U.S. Pat. No. 4,477,289 for METHOD FOR WASHING VOLTAGE TRANSMISSION LINE INSULATORS, disclosing a washing system mounted on a helicopter. The helicopter must steadily hover in proximity to high voltage wires while a worker sprays a high-pressure jet of pure water onto insulators. However, if there is any impurity in the water, the jet will energize and explode due to the high voltage.

There is also known U.S. Pat. No. 7,424,892 for METHOD AND APPARATUS FOR SAFELY CLEANING A LIVE EQUIPMENT, relating to spraying a pressurized jet of superheated steam from a ground location. This invention requires that a truck be able to get in proximity to a tower, and is energy-intensive due to the fact that water has to be superheated to produce steam.

There is known U.S. Pat. No. 7,797,781 for ROBOT MECHANISM FOR CLEANING AND INSPECTION OF LIVE-LINE INSULATORS that discloses a mechanism to clean insulators, which moves automatically along an insulator string. This invention does not use water, and is similar to the present invention.

There is also known U.S. Pat. No. 5,119,851 for EQUIPMENT TO CARRY OUT MAINTENANCE OPERATIONS, PARTICULARLY WASHING, ON INSULATOR CHAINS OF HIGH VOLTAGE ELECTRIC LINES, for an apparatus that autonomously crawls along an insulator chain and sprays a washing fluid on the insulators. However, to operate properly, this apparatus must be attached to a ground station's reservoir of washing fluid.

The present invention is an improvement on the autonomous insulator cleaning apparatus. The present invention can clean insulators either with brushes alone, or with a fluid and brushes. The fluid can be transported in a reservoir contained on the insulator cleaner of the present invention. The present cleaner can be placed on an insulator stack (also known as insulator chain or insulator string) by a drone, a helicopter, a person or a crane. The insulator cleaner then proceeds to thoroughly clean each insulator, somersaulting from one insulator to the next. Once finished, it can be removed the same way it was placed.

Object of the Present Invention

The present invention seeks to provide an apparatus to clean insulators without risk to human life. The invention is self-contained, fully autonomous, efficient and inexpensive to manufacture. In the preferred embodiment, the cleaner of the present invention is placed on one end of an insulator stack by a drone or UAV, and proceeds to clean each insulator, somersaulting between insulators on the same stack. Once it is finished cleaning the last insulator of a stack, it is removed by a drone or UAV, and moved to another insulator stack.

Cleaning is accomplished by cleaning means, namely brushes or bristles on the present invention, the brushes being rotated around each insulator by the present invention's novel mechanism.

DETAILED DESCRIPTION OF THE PREFERRED EMBODIMENT

The present invention aims to solve a recurring problem that plagues power transmission lines, namely contaminated insulators. Insulators are contaminated by animal waste such as bird droppings, sea air with a high salt content, dust that clings due to static electricity attraction, and other environmental factors. If insulators are covered by contaminants, they reduce power transmission efficiency, and can even cause damage to the power grid by arcing and flashovers. Therefore, power transmission companies must conduct routine cleaning of insulators.

The cleaning process is dangerous, difficult and expensive. The present invention addresses these issues by providing an autonomous system that is inexpensive to manufacture, easy to use, and does not put any lives in danger.

Figure 1:
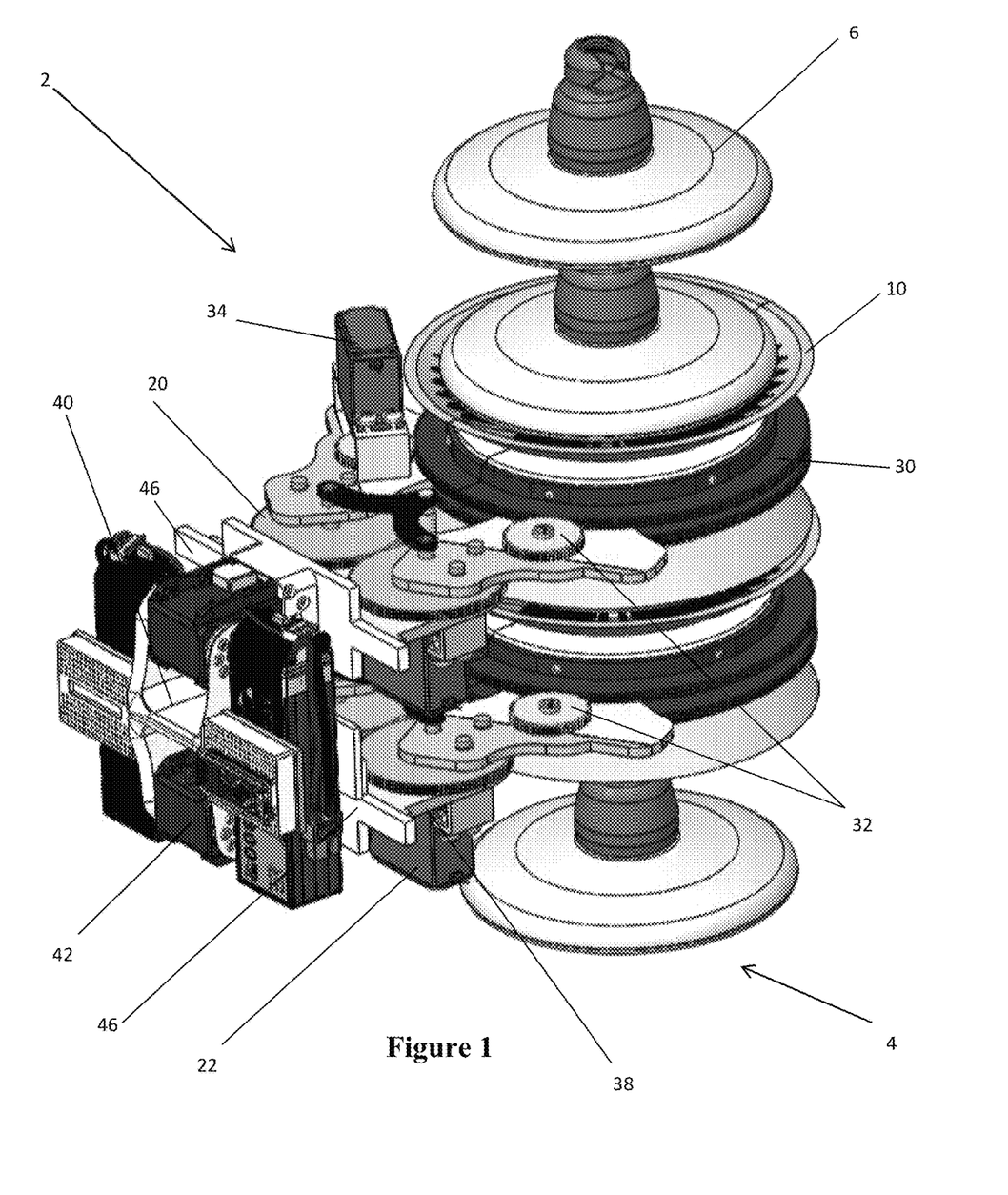
FIG. 1 shows a perspective view the present invention, comprising two cleaning cups, in its operational mode on a stack of insulators.

Referring now to drawings, FIG. 1 shows insulator cleaner assembly 2 as it is cleaning insulators 6. Assembly 2 comprises two sets of two mirror-image identical halves that close around an insulator for cleaning. Assembly 2 comprises two cup assemblies 10 attached to a spline 40.

Each cup assembly 10 is mounted on a gripper plate 38. Each gripper plate 38 is attached to gripper plate mount 46 that serves as a connector between cup assemblies 10, and each mount is affixed to a gripper plate motor 42 that rotates gripper plate. Gripper plate motor 42 serves the function to move said cup assemblies 10 along said insulator stack 4.

Figure 2:
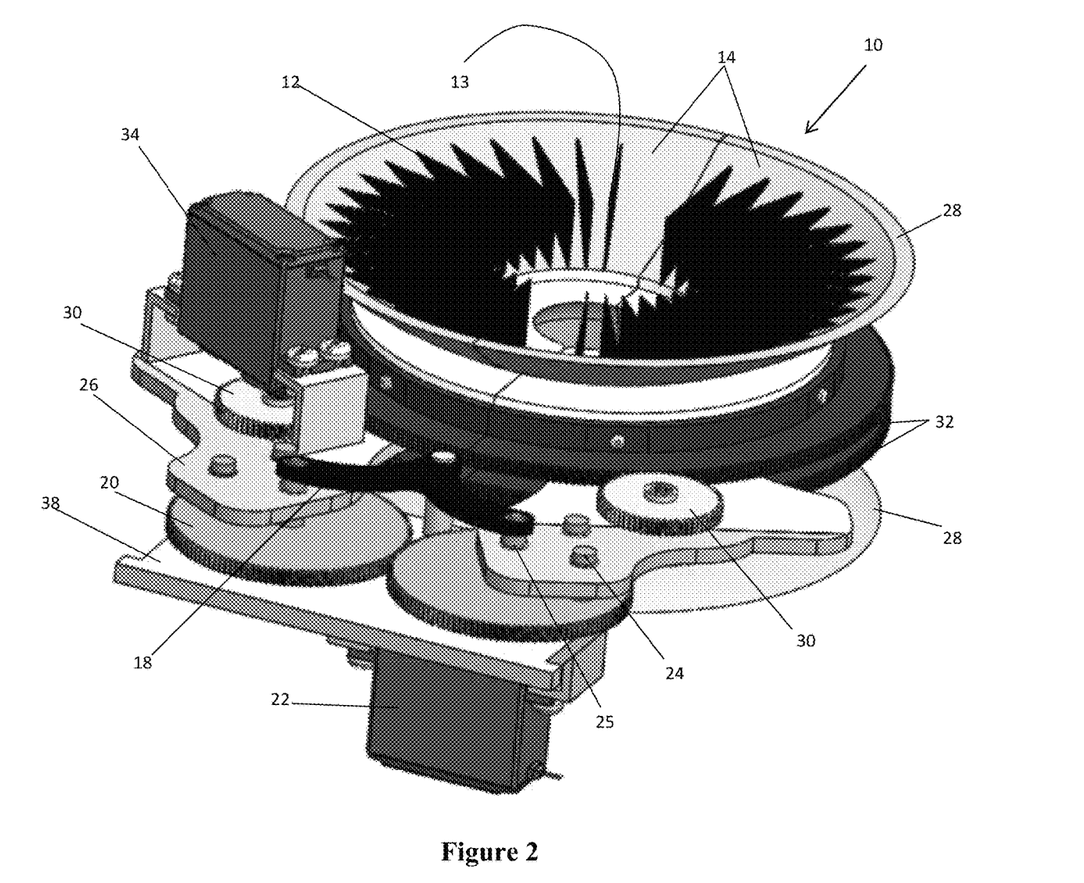
FIG. 2 shows a rear perspective view of one of the cup assemblies of FIG. 1 in operational mode.

FIG. 2 shows a more detailed view of a cup assembly 10 in Cleaning Mode, comprising two half-cup assemblies 14 on a gripper plate 38. Each half-cup assembly 14 comprises two half cups 28, said half cup 28 being of a half-conical shape with a wide end that has a larger crescent and a narrow part that has a smaller crescent, said half cup 28's shape being adapted to effectively cover half an insulator 6. Both half cups 28 of half-cup assembly 14 are oriented with their narrow parts substantially abutting end to end, creating an hour-glass shape in cross-section. Half cup 28's shape can differ to accommodate various types of insulators 6.

Half cup 28 comprises bristles 12 on the convex side 13 of half cup 28's half-conical shape, said bristles 28 being in line with the vertical plane and adapted to abrasively clean insulator 6. In another embodiment, convex side 13 also comprises fluid jets 15 (not shown) to dispense a cleaning fluid from fluid reservoir 49, said fluid being necessary for scrubbing insulator 6 in a more effective manner than just bristles 12 alone.

Each half cup assembly 14 comprises two racks 32 substantially between the meeting point of half cups 28, each rack 32 being semi-circular or crescent-shaped and following the curvature of half cups 28. Said rack 32 comprises teeth on its exterior periphery. When cup assembly 10 is in closed or locked-on position, said rack 32 comprises a closed loop around the outer circumference of said cup assembly 10.

Half cup assembly 14 is mounted on half cup arm 26 (seen in detail on FIG. 6), said arm 26 also accommodating half cup pinion 30 comprising a toothed gear wheel that is attached to motor 34 on one of two half cup assemblies 14. Motor 34 drives pinion 30, whose teeth engage with rack 32's teeth. Motor 34 serves as a means to rotate each cleaning cup 10 around insulator 6.

Each arm 26 of cup assembly 10 is mounted on a spur gear 20. Spur gear 20, comprising a flat gear with teeth around its periphery, is located on top of gripper plate 38. Spur gear 20 comprises a centric axis 25 and spur actuator 24, and is attached to spur motor 22 located on gripper plate 38 substantially underneath both spur gears 20. Spur actuator 24 is located on the periphery of spur gear 20, and is rotationally attached to arm 26. Both spur gears 20 are retained in place by spur holder 18 that is attached to both spur gear axes 25, being of a wishbone or "Y" configuration. When motor 22 turns spur gear 20, arm 26 moves on the horizontal axis. Motor 22 is a means to open and close each cup assembly 10 around said insulator 6. Spur gear 20 functions as a cam to open and close said arm 26.

Figure 3:
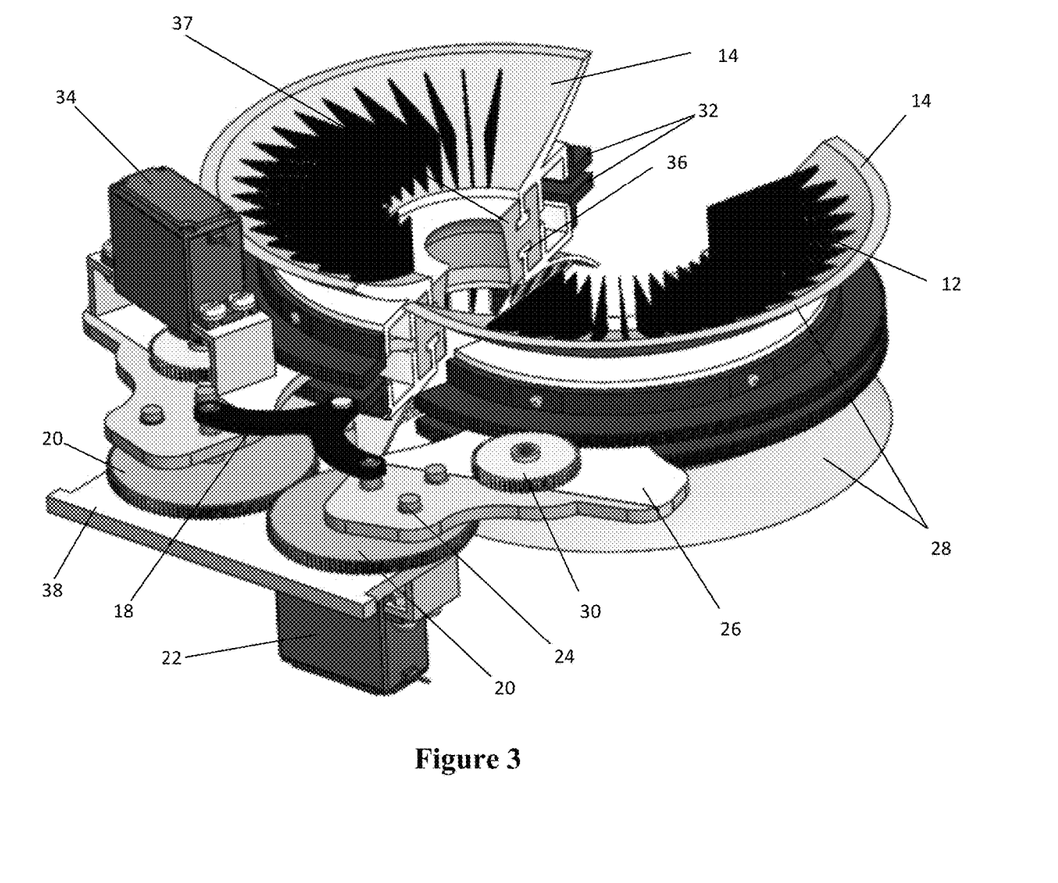
FIG. 3 shows a rear perspective view of the cup assembly of FIG. 2 in transitional mode.

Referring to FIG. 3, cup assembly 10 is shown in Transitional Mode. Spur motor 22 rotates one of the spur gears 20, causing the other spur gear to rotate in the opposite direction. This rotational motion rotates spur actuators 24, pulling outwardly on each arm 26 thus causing each half cup assembly 14 to rotate outwardly.

Figure 4:
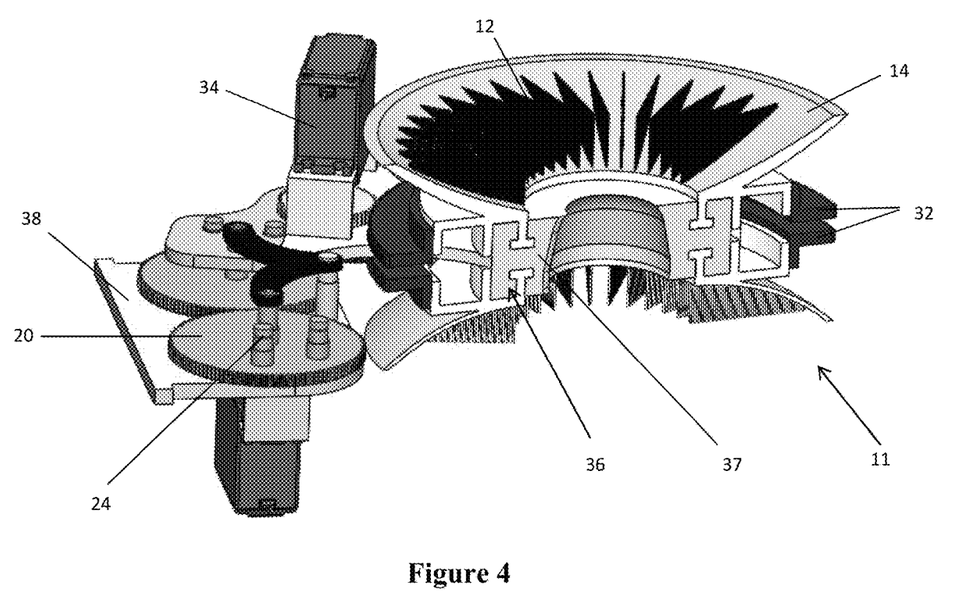
FIG. 4 shows a side view of the cup assembly of FIG. 3.

FIG. 4 shows the side view of FIG. 3, being one of the identical halves 11, demonstrating the relationship between half cup assembly 14 and arm 26, via track 36. Half cup assembly 14 is slidingly engaged inside arm 26's track 36, which comprises a substantially H-shaped track that slidingly cooperates with half cup assembly 14's H-shaped runner 37. In Cleaning Mode, when both half cup assemblies 14 are substantially adjacent to each other, track 36 becomes a continuous closed loop, and runner 37 becomes a continuous closed loop, and both half cup assemblies 14 can rotate around half cup assembly 14's vertical axis, actuated by half cup motor 34 via rack 32 and pinion 30 intercooperation. Gripper plate 38 is flat and rectangular, with a wall 45 that is attached to gripper plate mount 46, as seen on FIG. 1.

Figure 5:
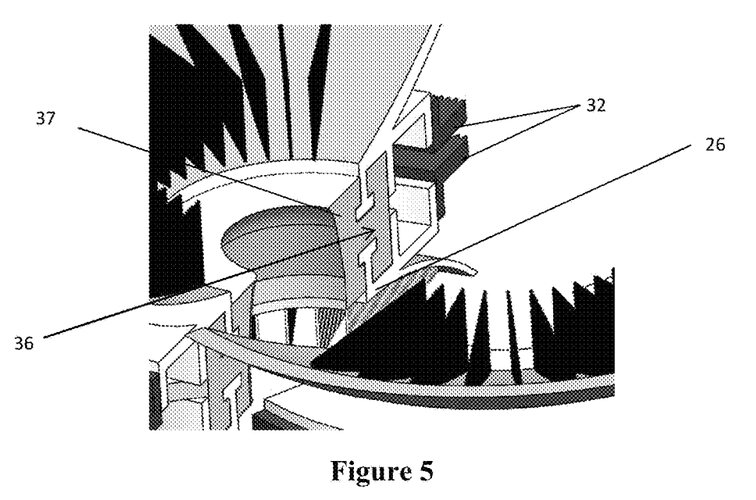
FIG. 5 shows a perspective view of the half cup assembly of FIG. 4.

FIG. 5 shows a more detailed view of the relationship between track 36 and runner 37. When half cup assembly 14 is turned by motor 34, arm 26 remains static and half cup assembly 14 turns due to the relationship between track 36 and runner 37.

Figure 6:
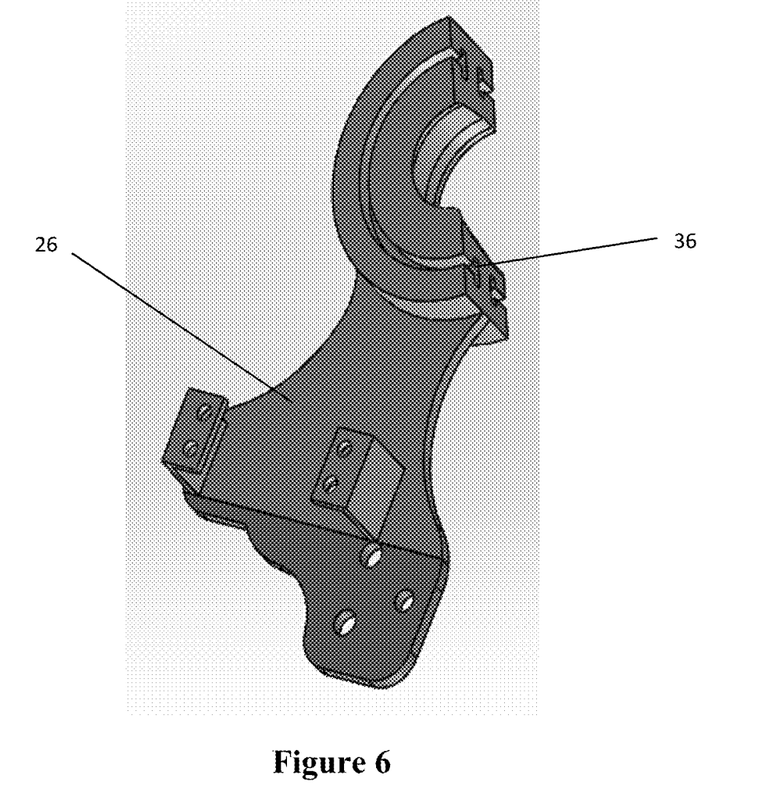
FIG. 6 shows a perspective view of a half cup arm.
Figure 7:
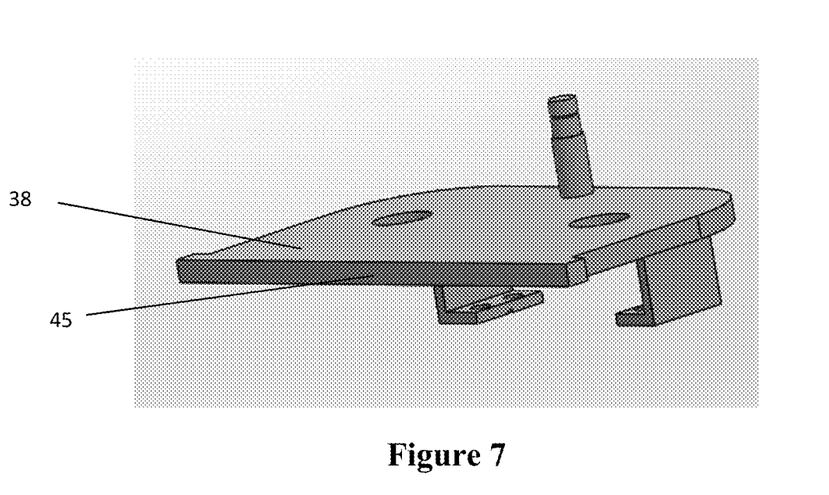
FIG. 7 shows a side view of a gripper plate.
Figure 8:
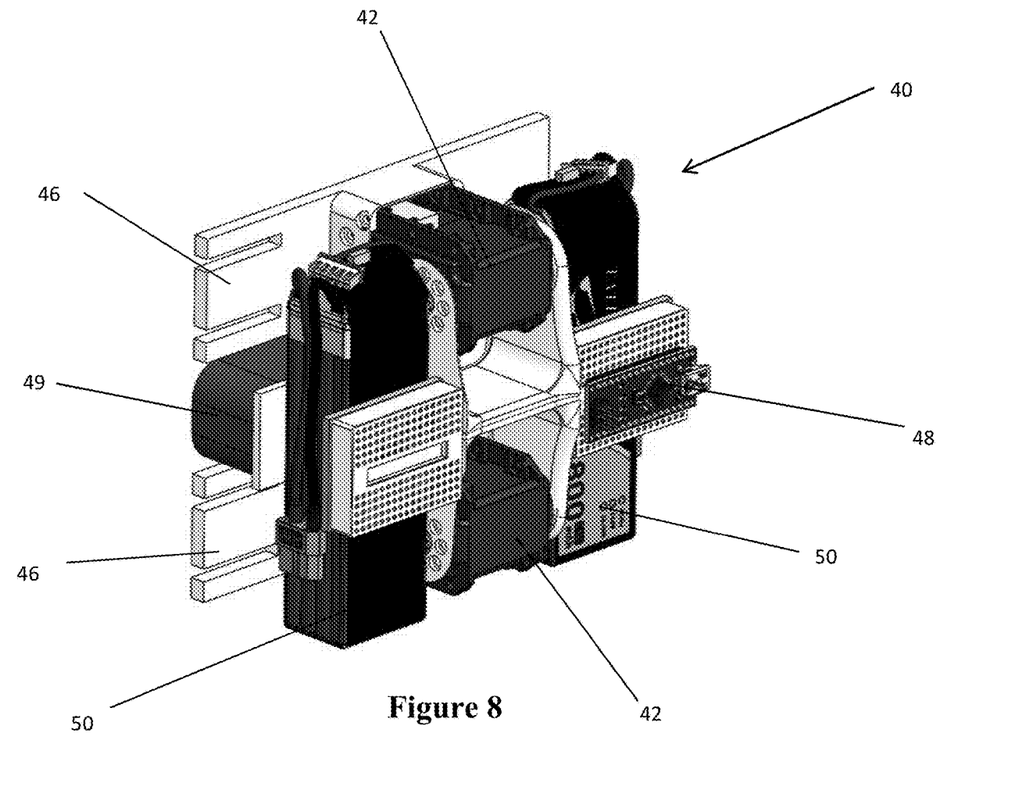
FIG. 8 shows a perspective view of the spline.

FIG. 6 shows half cup arm 26 alone, comprising the H-shaped track 36. FIG. 7 shows gripper plate 38. FIG. 8 shows spline 40 comprising power supply 50 in the form of two batteries, a controller 48, a fluid reservoir 49, and motors 42 that rotate gripper plate mounts 46, an action that permits the cleaner assembly 2's somersaulting function.

Figure 9:
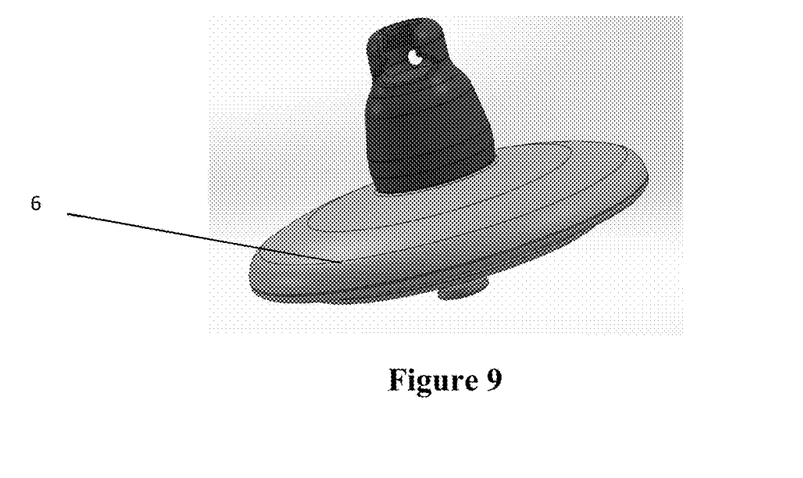
FIG. 9 shows a side view of an insulator.
Figure 10:
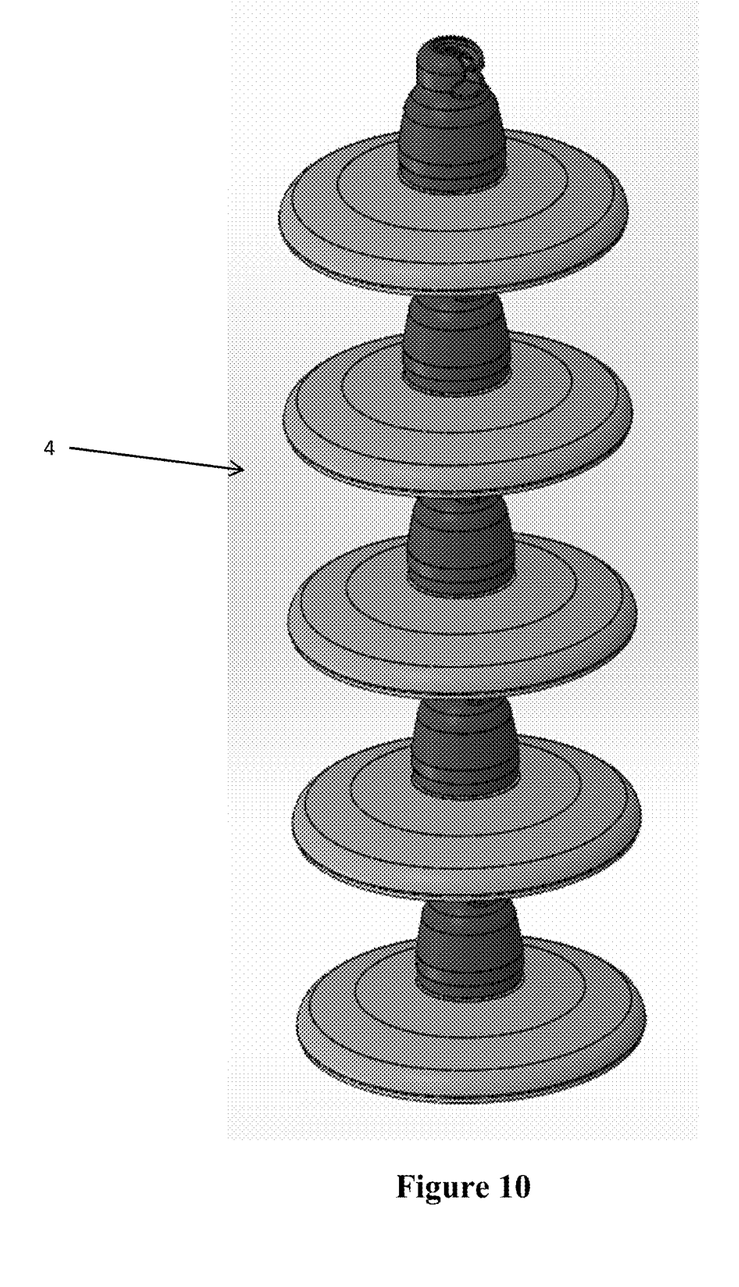
FIG. 10 shows a perspective view of an insulator stack.
Figure 11:
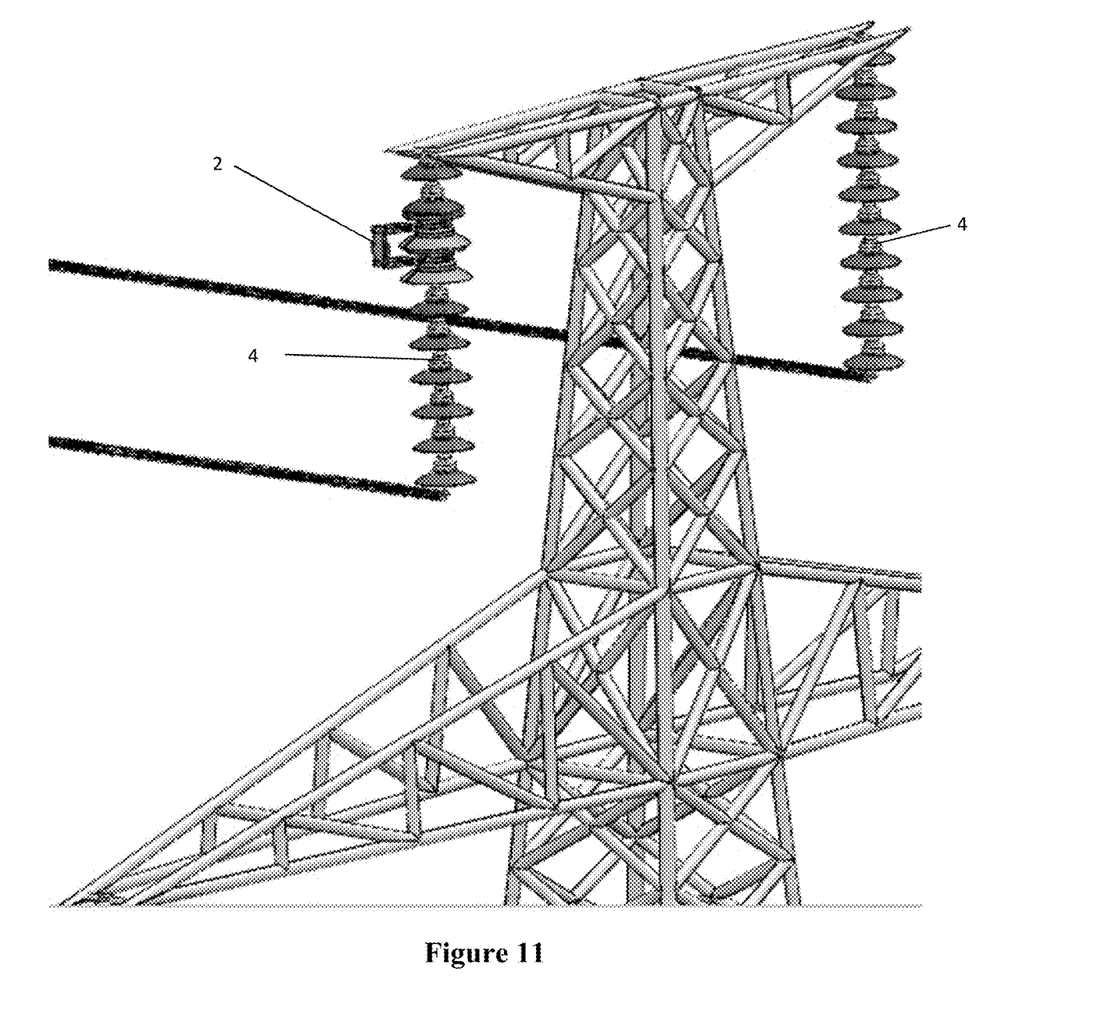
FIG. 11 shows a power line tower with the present invention in operational mode on an insulator stack.
Figure 12:
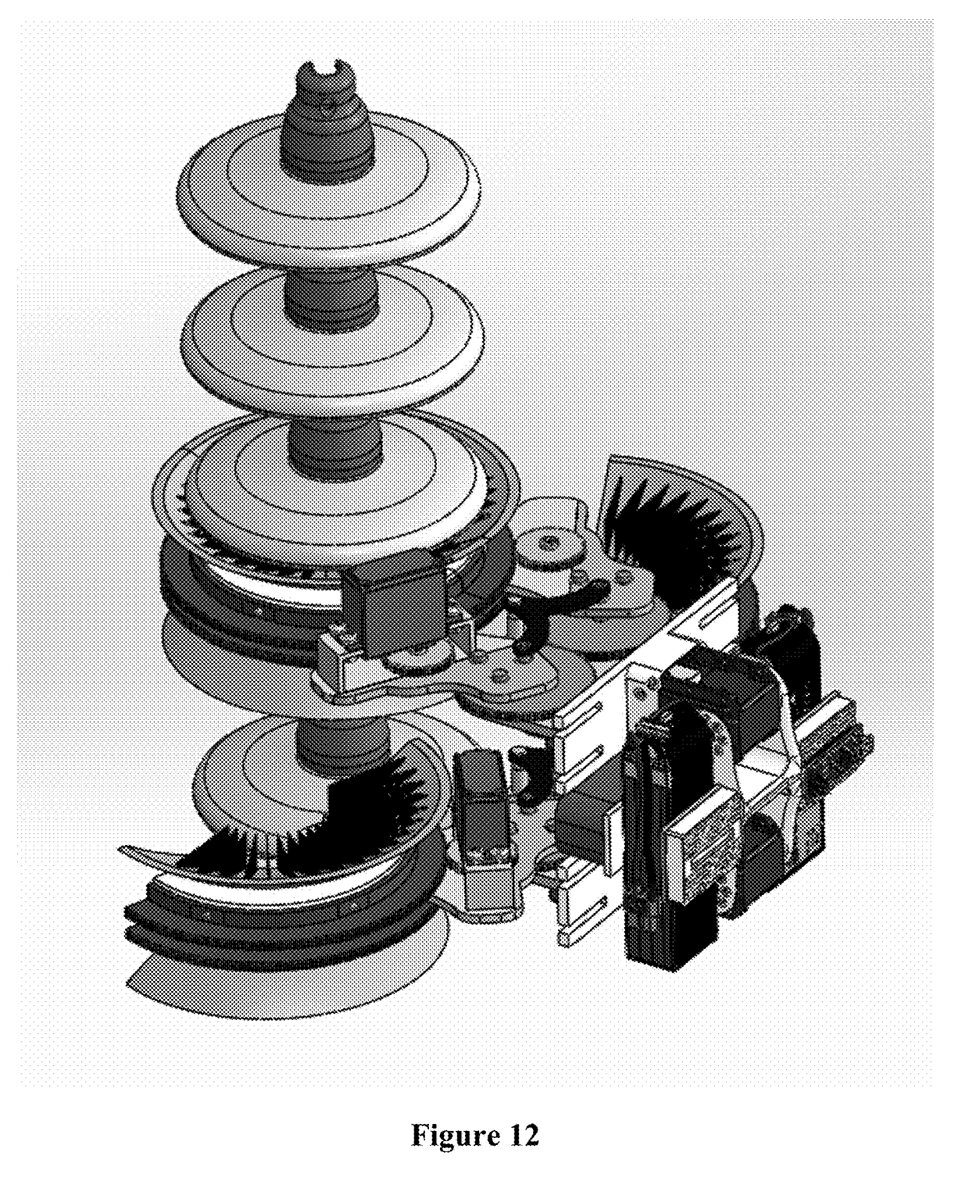
FIG. 12 shows a side view of the first stage of transitional mode of the present invention.
Figure 13:
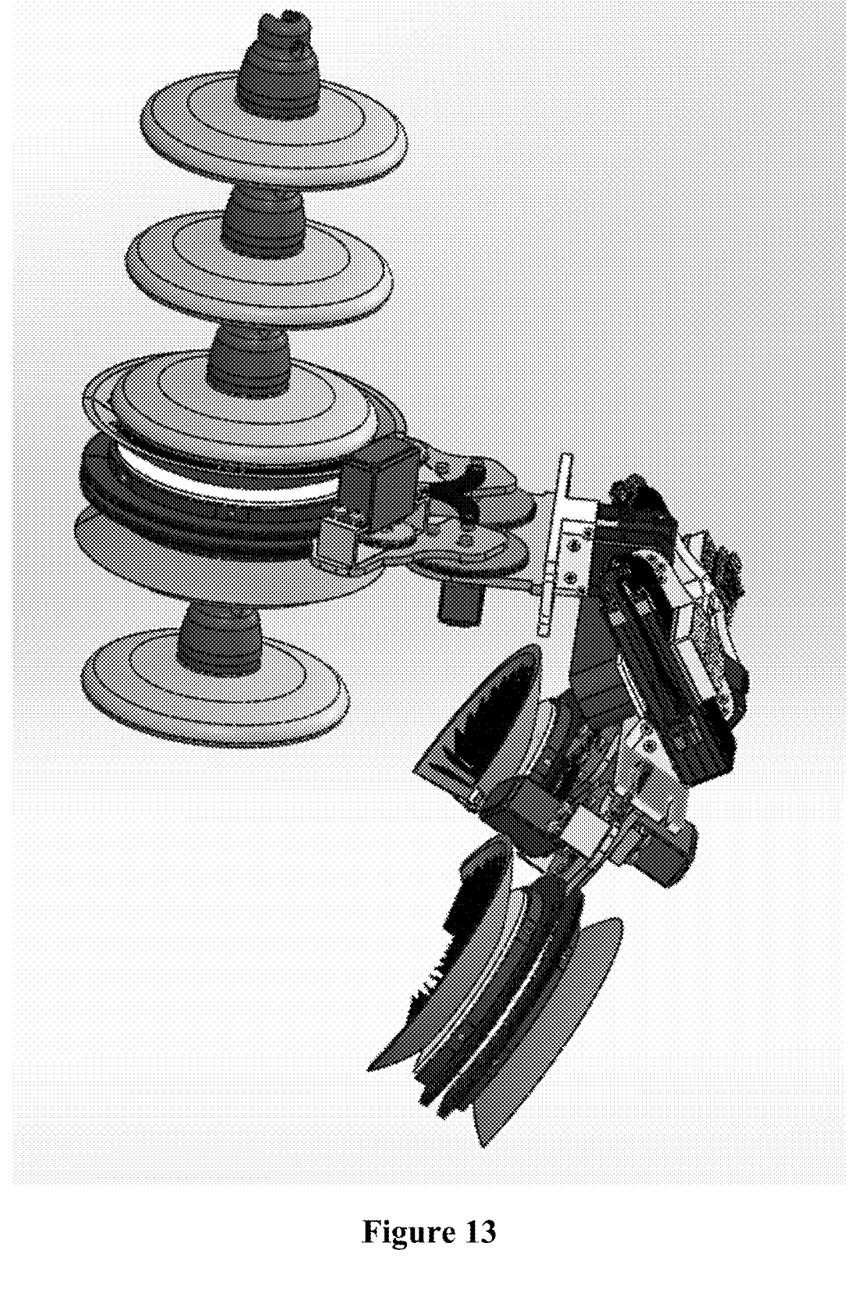
FIG. 13 shows a side view of the second stage of transitional mode of the present invention.
Figure 14:
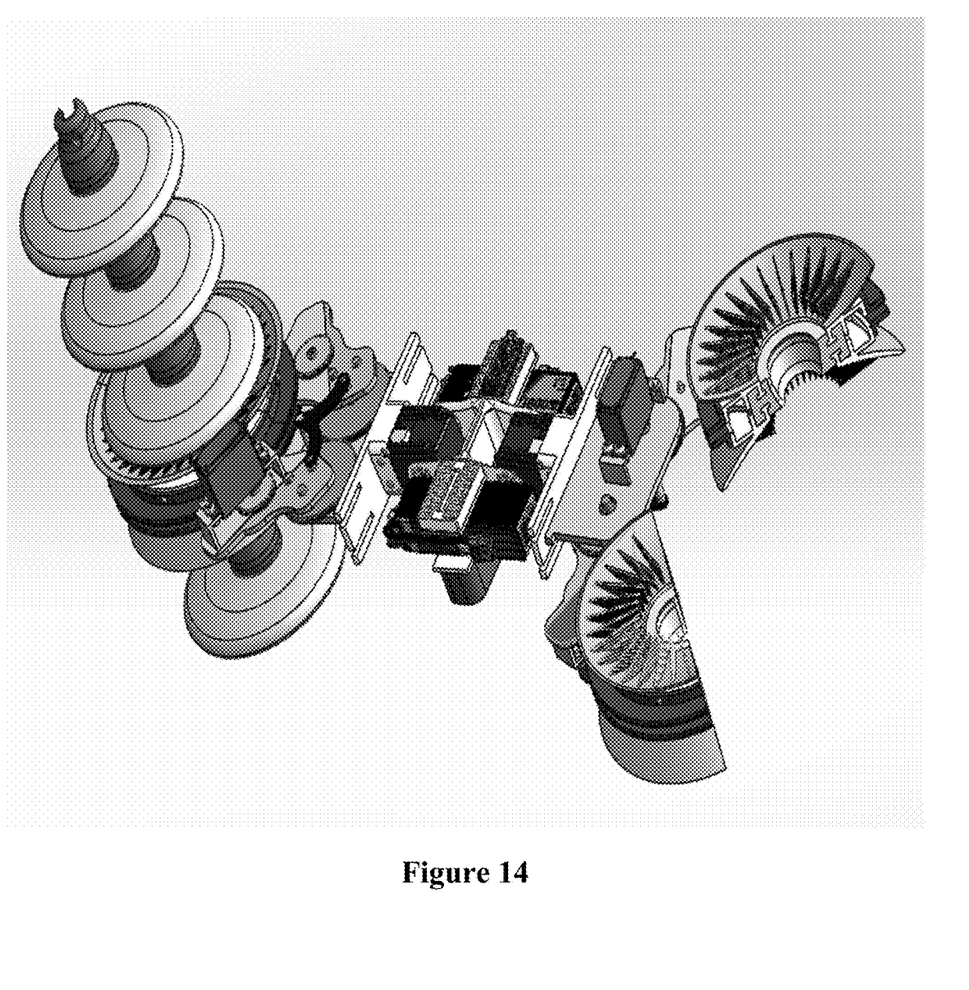
FIG. 14 shows a side view of the third stage of transitional mode of the present invention.
Figure 15:
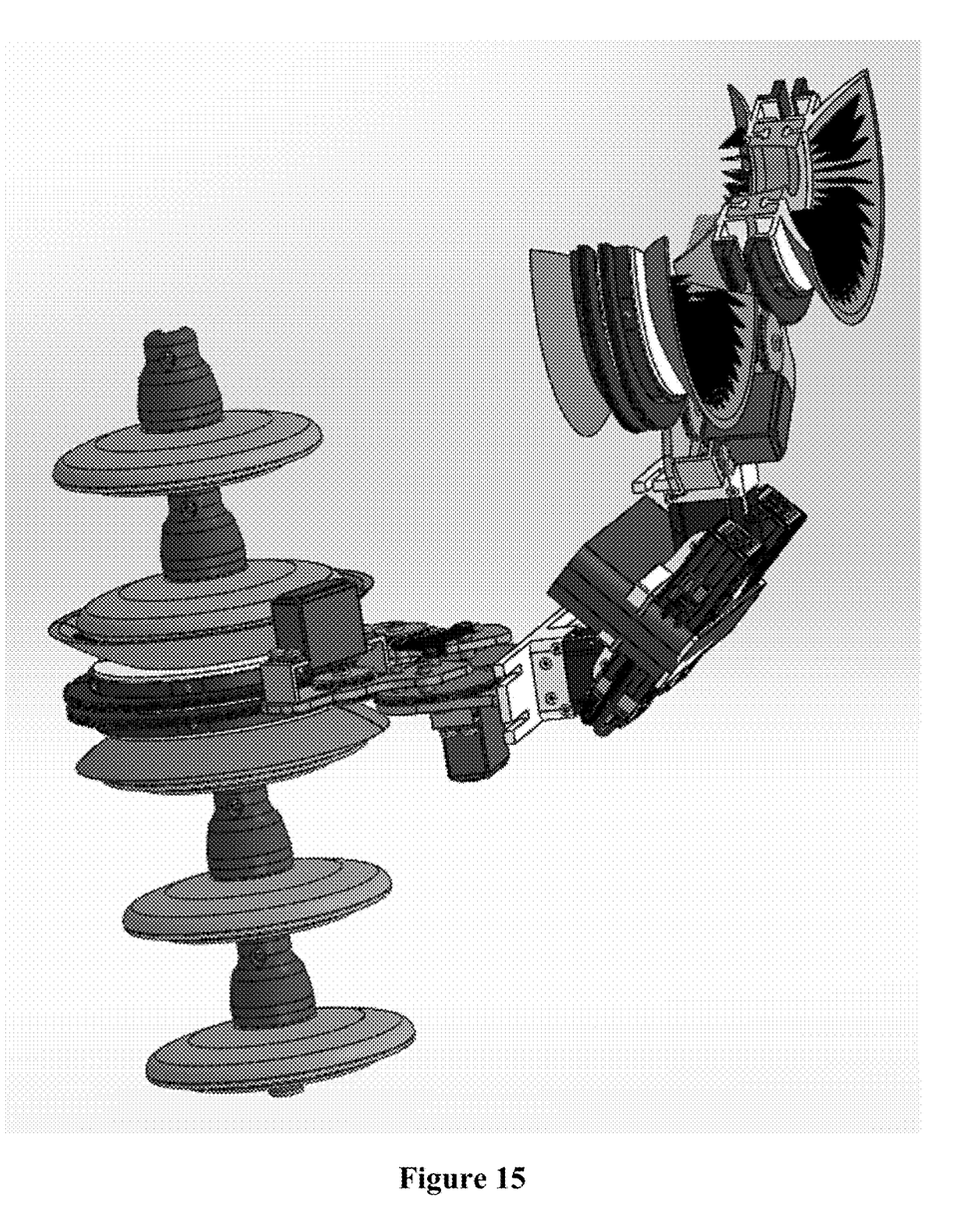
FIG. 15 shows a side view of the fourth stage of transitional mode of the present invention.
Figure 16:
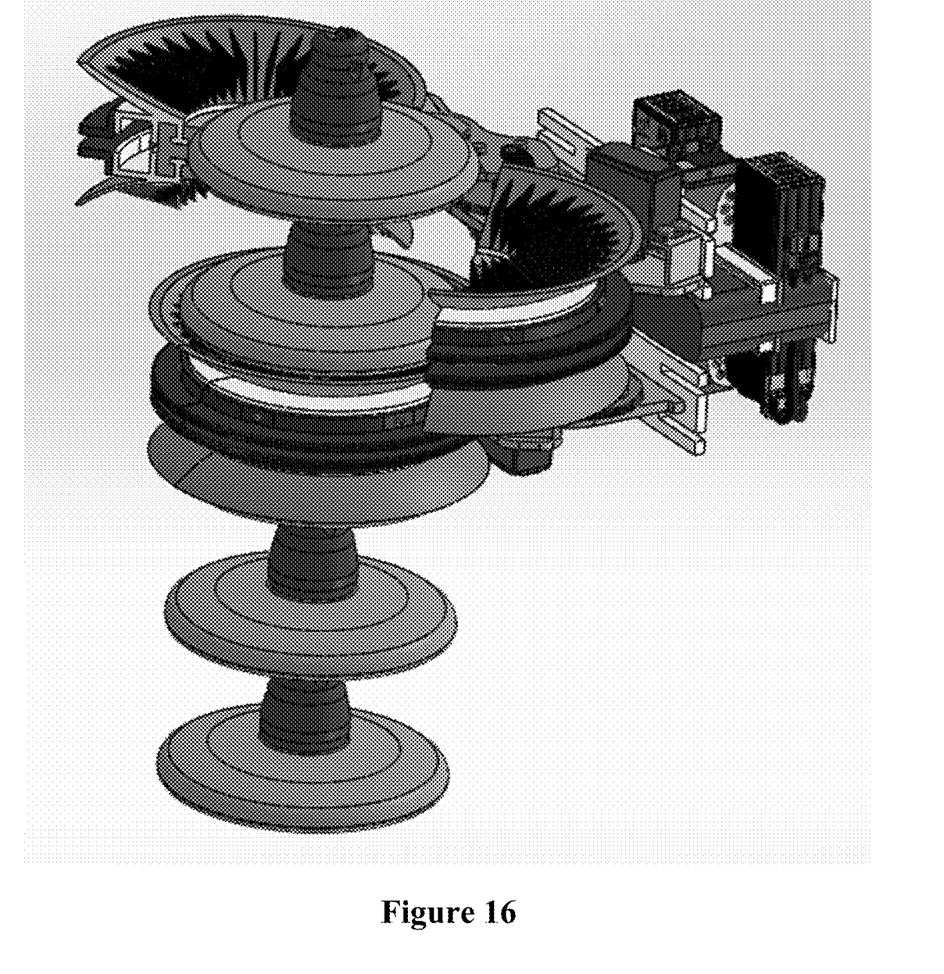
FIG. 16 shows a side view of the fifth stage of transitional mode of the present invention.
Figure 17:
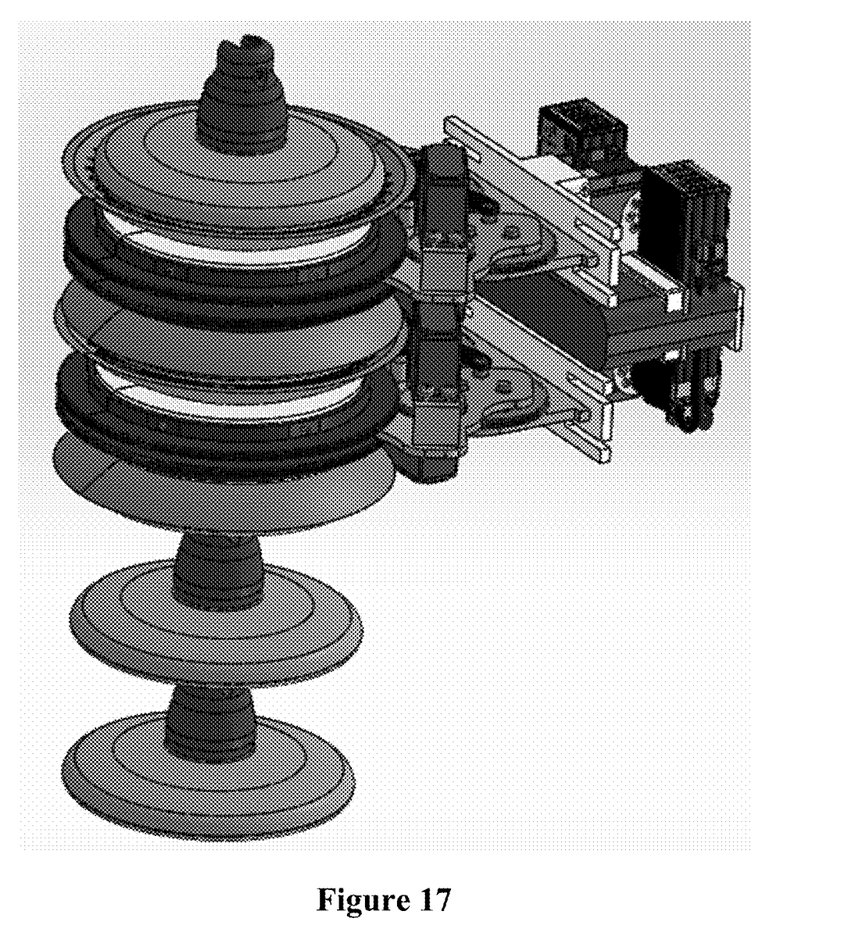
FIG. 17 shows a side view of the sixth stage of transitional mode of the present invention.

FIG. 9 shows a typical insulator 6, comprising a disk-shaped element with a central portion that permits insulators 6 to be configured in a stack, chain or string. FIG. 10 shows an insulator stack 4, comprising a series of insulators 6. FIG. 11 shows cleaner assembly 2 on an insulator stack 4.

FIGS. 12 to 17 show a step by step description of insulator cleaner assembly 2 transitioning from one insulator 6 to another, up an insulator stack 4.

In operation, the preferred embodiment of the present invention works as follows: drone 8 (not shown) transports cleaner assembly 2 to the bottom of an insulator stack 4. Both cups 10 are in Transitioning Mode (open) during transport. Once drone 8 aligns cleaner 2 on stack 4, both cups 10 close around the bottom two insulators 6 on stack 4 by actuating motors 22, powered by power supply 50. Once closed, each cup assembly 10 is in cleaning or locked-on position.

Motors 22 drive spur gears 20 in a counter-rotation, pushing on spur actuators 24 that are rotationally connected to arms 26. Arms 26 pivot around spur gear axes 25 as spur actuators 24 are being pushed, thus bringing both half cup assemblies 14 together until all assemblies 14 abut each other, enveloping insulators 6, in Cleaning Mode.

Once closed in Cleaning Mode, half cup motors 34 turn rack gears 32, which transfer the turning action to pinions 30, thus turning cups 10 around insulators 6. Cups 10 are free to turn inside arm 26's track 36 due to their runners 37. Cups 10 turn in opposite direction to each other to prevent cleaner 2 from spinning around stack 4. As cups 10 turn, bristles 12 remove contaminants off insulators 6. Once cups 10 have completed their cleaning cycle, controller 48 assures that each half cup assembly 14 stops on its respective arm 26. Otherwise, arms 26 will not be able to open to Transitional Mode.

To transition up insulator stack 4, the bottom spur motor 22 turns bottom spur gears 20 in opposite directions to force spur actuator 24 to pull on arm 26, thus opening bottom cup 10 into Transitional Mode. Transitional Mode requires that cup 10 be open wide enough to clear the outer periphery of insulator 6.

When cup 10 is open, gripper plate motors 42, engaging with gripper plates 38 via gripper plate mounts 46, rotate cup 10 upwardly, as seen on FIGS. 12 to 17. The lower cup 10 somersaults through a 360-degree rotation, and becomes the upper cup 10. Once the transitioning cup 10 is in position around insulator 6, the spur mechanism closes both half cup assemblies 14 around insulator 6 and the procedure repeats again until cleaner 2 has reached the top of insulator stack 6. Once cleaner has finished cleaning stack 6, drone 8 can move cleaner 2 to a different stack.

An optional feature of the preferred embodiment comprises a fluid system with a reservoir 49 and jets 15. Also, cleaner 2's direction up or down the stack 4 is not important, and the described operation is identical but reversed if drone 8 initially transports cleaner 2 to the top of stack 4, and not to the bottom.

The invention claimed is:

1. An apparatus for cleaning a power line insulator stack comprising
two cleaning cups,
wherein said cups are mounted on cup assemblies,
wherein said cups are provided with cleaning means, and
wherein each cup assembly comprises two identical halves adapted to be closed around an insulator,
a connector between said cup assemblies,
a means to rotate each cleaning cup around an insulator in said insulator stack,
a means to open and close each cup assembly around said insulator,
a means to move said cup assemblies along said insulator stack,
a power supply,
wherein said power supply provides the required energy for said means to rotate each cup, means to open and close each cup assembly, and means to move said cup assemblies, and
a controller,
wherein said controller coordinates the sequence of actions necessary to clean said insulator stack,
wherein each cleaning cup comprises two half-cups, each cleaning cup having an hour-glass configuration adapted to simultaneously clean one surface of a first insulator and the adjacent surface of a second insulator directly abutting said first insulator.

2. An apparatus for cleaning a power line insulator stack according to claim 1, wherein each half-cup is provided with a toothed track around its periphery, a cup runner, and cleaning means that comes in contact with said insulator.

3. An apparatus for cleaning a power line insulator stack according to claim 1, wherein each half cup is mounted on an arm, said arm being mounted on a cam mechanism.

4. An apparatus for cleaning a power line insulator stack according to claim 3, wherein each arm is provided with a track that interacts with said cup runner, wherein in a cleaning mode, said arms mate and said track provides seamless rotation of said cleaning cup through the interaction of said cup's runners inside said track.

5. An apparatus for cleaning a power line insulator stack according to claim 4, wherein said means to rotate each cup around an insulator comprises a motor with a toothed gear that interacts with said toothed track around said cup's periphery, said motor being mounted on said arm.

6. An apparatus for cleaning a power line insulator stack according to claim 4, wherein said means to open and close each cup assembly around said insulator comprises a motor mounted on a plate that actuates each arm by turning a first gear that acts on a second gear, said gears acting as cams, with said arms, being attached to said cams, being able to close said cup assemblies around said insulator for cleaning mode or open said cup assemblies for a transitioning mode.

7. An apparatus for cleaning a power line insulator stack according to claim 6, wherein said means to move said cup assemblies along said insulator stack comprises two motors mounted on said connector between said cup assemblies, wherein said motors apply a rotational force to said plates of both cleaning cups.

8. An apparatus for cleaning a power line insulator stack comprising
two cleaning cups,
a means to rotate said cleaning cups around an insulator,
wherein a cleaning cup has an hour-glass shape to simultaneously clean one surface of said insulator and another surface of a directly adjacent insulator,
wherein each cleaning cup is made up of two mirror image half-cups along the vertical axis, said half-cups encircling said insulator for a cleaning or locked-on position,
said half-cups each being mounted on an arm,
said arms being mounted on
a means to rotate said arms between said cleaning and a transitioning position,
said means to rotate said arms being mounted on
mounting plates, said plates being attached to
a connector between said mounting plates with
a means to rotate said plates,
wherein said means to rotate said plates moves said apparatus along said insulator stack to clean all insulators,
a power supply, and
a controller to synchronize movement of said apparatus.

9. An apparatus for cleaning a power line insulator stack according to claim 8, wherein said means to rotate said cleaning cups around said insulator comprises a rack around the outer circumference of said cleaning cup and a pinion driven by a motor, said pinion and motor being mounted on said arm.

10. An apparatus for cleaning a power line insulator stack according to claim 8, wherein each arm has a track for a runner on said cleaning cup, wherein in said cleaning position, said tracks form a closed loop thereby allowing said cup to complete revolutions around said insulator by virtue of its runner being locked inside said closed loop.

11. An apparatus for cleaning a power line insulator stack according to claim 8, wherein said means to rotate said arms between said cleaning and said transitioning positions comprises a motor attached to a cam assembly on said mounting plate, wherein said arm is also attached to said cam assembly.

12. An apparatus for cleaning a power line insulator stack according to claim 8, wherein said means to rotate said plates comprises two motors attached to said connector, wherein each motor is attached to each mounting plate, and both motors are adapted to transition said cleaning cups along said insulator stack by somersaulting one cleaning cup in transitioning mode to the next insulator while the other cup is in locked-on mode to one insulator.

\* \* \* \* \*